UNITED STATES PATENT OFFICE.

ANDRÉ BELTZER AND CYRILLE DELCAMPE, OF BRIDGEPORT, CONNECTICUT.

AUTOGENOUS METHOD OF WELDING CAST-IRON.

No. 907,718.      Specification of Letters Patent.      Patented Dec. 29, 1908.

Application filed October 24, 1907. Serial No. 398,872.

*To all whom it may concern:*

Be it known that we, ANDRÉ BELTZER and CYRILLE DELCAMPE, the former a citizen of the Republic of France, the latter a subject of the King of the Belgians, residing at Bridgeport, in the county of Fairfield and State of Connecticut, have invented a certain new and useful Autogenous Method of Welding Cast-Iron; and we do hereby declare the following to be a full, clear, and exact description of the invention, such as will enable others skilled in the art to which it appertains to make and use the same.

The present invention relates to an autogenous method of welding cast iron.

The attempt has been repeatedly made to weld together pieces of cast iron, but so far without success, and apparently because of the presence in cast iron of substances such as silicon, phosphorus, carbon, silica and sulfur, not to speak of other things in such quantities as to forbid or prevent the contact of the iron of the one piece with the iron of the other piece.

The object, therefore, of the present invention, is to produce a method which will act to remove welding preventive ingredients of cast iron at the juncture.

To this end the invention consists in the method hereinafter described and particularly defined in the claims.

The best mode of practicing the present method is as follows: The surfaces of the pieces of iron to be welded together should be cleaned by grinding, filing, or the use of emery cloth, or otherwise for the purpose of removing rust, and foreign substances. This is not, however, essential, for the reason that the very characteristics of the method by virtue of which it is possible to weld cast iron, render it unnecessary to clean the surfaces to be welded, and indeed it is one of the peculiar virtues of this process that this step need not necessarily be taken, as the process of welding eliminates such impurities as rust or other foreign substances on the surfaces to be joined. For example, in the case of a cracked engine cylinder, where the portions to be welded have not been entirely broken apart, access of course to the joint is impossible, but the welding of the fracture may be accomplished without the cleaning of the surfaces. Where the parts are loose and separate from each other, they should be supported in proper relative position to each other before beginning the operation of welding. Then the junctural portions of the pieces to be welded, that is, the portions adjacent the juncture, are heated somewhat before applying the flux. It is convenient to heat the junctural portion before applying the flux, because when the flux is applied it melts and adheres to the surface and runs into the interstice between them, but it is not necessarily essential, as the method may be practiced without such heating. Thereupon the junctural portions of the pieces are sprinkled with a flux powder having the property, when heated in contact with the cast iron to substantially the melting point of the cast iron, of substantially removing the welding preventive ingredients of the cast iron, that is to say, removing the welding preventive ingredients of the cast iron to an extent sufficient to permit practical welding. The actual welding of the pieces together is now accomplished by heating the junctural portions of the cast iron to substantially the melting point. It is preferred during this heating operation to add cast iron to the joint, and for this purpose a rod or pencil of cast iron is dipped in the flux and presented to the heating flame where it is melted and flowed on to the joint, much in the same manner that solder is applied to a joint in soldering pieces of tin together, except, of course, that being cast iron, the cooling process is so much faster that each portion of the joint must be finished as the heat is advanced along it. The addition of the flux to the cast iron rod which is melted on a joint is for the purpose of refining the cast iron as it is applied to the joint, so that it will form a union with the pieces of cast iron to be welded, and also to bring some flux into the molten metal of the pieces to be welded but in its broader aspects the invention is not limited to the use of such added cast iron as under certain circumstances such addition might not be necessary.

Blow holes may be filled by the addition of cast iron in the above described manner, so also errors in workmanship may be cured by adding cast iron to surfaces where too much has been removed, or, again, a protuberance may be formed by adding cast iron at any particular place where it is desired. A valuable feature of the invention consists in this, that when such cast iron is added to an original casting or piece, the added portion and its joint with the original iron are stronger than the original casting.

The best flux for use in this process consists of a mixture of substantially 65% potassium chlorid, 15% lithium chlorid, and 20% potassium fluorid. The ingredients of the flux may be varied considerably. For example, a fluorid or chlorid of any of the alkali or alkali-earth metals may be used as a flux. Such a flux may be generically defined as an "alkali-alkali-earth-metal fluor-chlor-id flux." Experience demonstrates that the fluorids and chlorids of the alkali metals are the best flux ingredients for the ordinary grades of cast iron. The inclusion of some lithium chlorid in the preferred flux is for the purpose of making the substance deliquescent, so that when sprinkled on the junctural portions it will adhere thereto as well as to the rod of cast iron when dipped in it. Calcium chlorid, another deliquescent chlorid, may be used in place of the lithium chlorid, but the latter is preferred because it liberates chlorin in the desired amounts, which assists in the elimination of the welding preventive ingredients of cast iron. The chlorids of the alkali metals are preferred to the chlorids of the alkali-earth metals for the reason that they melt at a lower temperature, vaporize more freely, and act more energetically in the welding operation.

In case a fluorid alone is used as the flux the welding is made with great facility and the joint is strong, malleable, and easily tooled but the existence of cavities in the joint, apparently caused by the excessive liberation of gases, to some extent weakens it. On the other hand, if a chlorid alone is used as the flux the joint is devoid of the cavities and is strong, tough and so hard as to be tooled with difficulty. While the use of a fluorid alone, where the cavitation does not inhibit and the use of a chlorid alone, where the hardness of the joint is desirable or immaterial are within the purview of the invention, it is preferred to use a mixture of chlorids and fluorids as thereby a joint is secured which is devoid of appreciable cavitation, strong, tough, capable of being readily tooled, and malleable.

It is preferred to make the flux of a very intimate mixture of the salts of which it is composed for the reason that when mixed intimately the mixture has a unitary melting point. To this end the flux may be prepared by mixing concentrated solutions of the salts, evaporating the mixture to dryness and grinding the residuum, or it may be made by melting the salts together, taking care to use as low a temperature as is possible in order to avoid decomposition of any of the ingredients, and then grinding the solidified mixture.

This invention is based upon principles which are not fully understood but it is believed that the chemical reactions are somewhat as follows:—Taking, for example, the action of the fluorid, which is believed to be typical of the action of the other salts, it is believed that the flourid, with the water produced by the combustion of the flame used for heating, reacts with the silica contained as an impurity in the commercial fluorid used, and with the silica in the cast iron and with the silica produced by the combustion of the silicon contained in the cast iron, and forms metallic silicates which flow to the surface as a slag and fluor-hydric acid which attacks the other impurities of the cast iron.

In general it is believed that the operation is based upon the affinity of the halogenids and the halogenid acids for the impurities of the cast iron.

The means for heating the junctural portions of the metal is preferably an oxygen-acetylene blow pipe by means of which high temperature may be secured.

Having thus described the invention, what is claimed is:—

1. The autogenous method of welding cast iron which consists in applying to the junctural portions of the pieces to be welded an alkali-alkali-earth-metal fluor-chlor-id flux, and heating such junctural portions to substantially the melting point of cast iron, substantially as described.

2. The autogenous method of welding cast iron which consists in applying to the junctural portions of the pieces to be welded a flux consisting of a mixture of alkali-alkali-earth-metal chlorids and fluorids, and heating such junctural portions to substantially the melting point of cast iron, substantially as described.

3. The autogenous method of welding cast iron which consists in applying to the junctural portions of the pieces to be welded an alkali-alkali-earth-metal fluor-chlor-id flux, heating such junctural portions to substantially the melting point of cast iron, and adding cast iron and such flux during such heating, substantially as described.

4. The autogenous method of welding cast iron which consists in applying to the junctural portions of the pieces to be welded a flux having as an ingredient an alkali-metal chlorid, heating such junctural portions to substantially the melting point of cast iron, and adding cast iron and such flux during such heating, substantially as described.

5. The autogenous method of welding cast iron which consists in applying to the junctural portions of the pieces to be welded a flux consisting of a mixture of alkali-alkali-earth-metal chlorids and fluorids, heating such junctural portions to substantially the melting point of cast iron, and adding cast iron and such flux during such heating, substantially as described.

6. The autogenous method of welding cast iron which consists in applying to the junctural portions of the pieces to be welded a flux consisting of a mixture of substantially 80% alkali chlorids and 20% alkali fluorids, and heating such junctural portions to substantially the melting point of cast iron, substantially as described.

7. The autogenous method of welding cast iron which consists in applying to the junctural portions of the pieces to be welded a flux consisting of a mixture of substantially 80% alkali chlorids and 20% alkali fluorids, and heating such junctural portions to substantially the melting point of cast iron, and adding cast iron and such flux during the heating, substantially as described.

8. The autogenous method of welding cast iron which consists in applying to the junctural portions of the pieces to be welded a flux having as an ingredient a chlorid of an alkali metal, and heating such junctural portion to substantially the melting point of cast iron, substantially as described.

9. The autogenous method of welding cast iron which consists in applying to the junctural portions of the pieces to be welded a flux consisting of a mixture of substantially 65% potassium chlorid, 15% lithium chlorid and 20% potassium fluorid, and heating the junctural portion to substantially the melting point of cast iron, substantially as described.

10. The autogenous method of welding cast iron which consists in applying to the junctural portions of the cast iron a flux, an ingredient of which is a highly deliquescent alkali-alkali-earth-metal chlorid, and heating the junctural portions to substantially the melting point of cast iron, substantially as described.

11. The autogenous method of welding cast iron which consists in applying a flux acting to substantially remove the welding preventive ingredients of cast iron, and heating the junctural portions to substantially the melting point of cast iron, substantially as described.

12. The autogenous method of welding cast iron which consists in heating the junctural portions, applying a flux acting to substantially remove the welding preventive ingredients of cast iron, and heating the junctural portions to substantially the melting point of cast iron, substantially as described.

13. The autogenous method of welding cast iron which consists in applying a flux acting to remove some of the welding preventive ingredients of cast iron, heating the junctural portions to substantially the melting point of cast iron, and adding cast iron and such flux during the heating, substantially as described.

In testimony whereof we affix our signatures, in presence of two witnesses.

ANDRÉ BELTZER.
CYRILLE DELCAMPE.

Witnesses:
H. T. PARROTT,
R. C. SEELEY.